Jan. 17, 1961

W. ORTEGA, JR., ET AL 2,968,433

AIR COMPRESSOR UNLOADER

Filed April 14, 1958

INVENTOR.
William Ortega Jr. and
Paul E. Webb.
BY
ATTORNEYS.

United States Patent Office 2,968,433
Patented Jan. 17, 1961

2,968,433

AIR COMPRESSOR UNLOADER

William Ortega, Jr., Kansas City, and Paul E. Webb, Avondale, Mo., assignors to General Supply Company, Kansas City, Mo., a corporation of Missouri Filed Apr. 14, 1958, Ser. No. 728,411

1 Claims. (Cl. 230—30)

This invention relates to air compressors, and more particularly to unloader structures for holding the intake valves of the compressor cylinders open when a predetermined air pressure in a compressed air receiver is obtained. Unloader assemblies have been used with air compressors wherein the unloaders included pistons reciprocable in cylinders all assembled in the air compressor valve structure wherein it was necessary to completely disassemble the structure in order to replace packing and otherwise service the structure.

The principal objects of the present invention are to overcome the difficulties previously experienced in replacing packing and servicing unloader assemblies; to provide an unloader structure with an unloader piston and cylinder assembly with a portion exteriorly of the valve and air passages and having a removable cap on the cylinder whereby removing of the cap provides access to the piston for the replacement of packing or servicing of the unloader; and to provide a simple, efficient unloader structure that is easy to maintain and that can be serviced with a minimum of labor and time.

Other objects and advantages of this invention will become apparent from the following description taken in connection with the accompanying drawings wherein are set forth by way of illustration and example certain embodiments of this invention.

Figures 1, 2, 3:
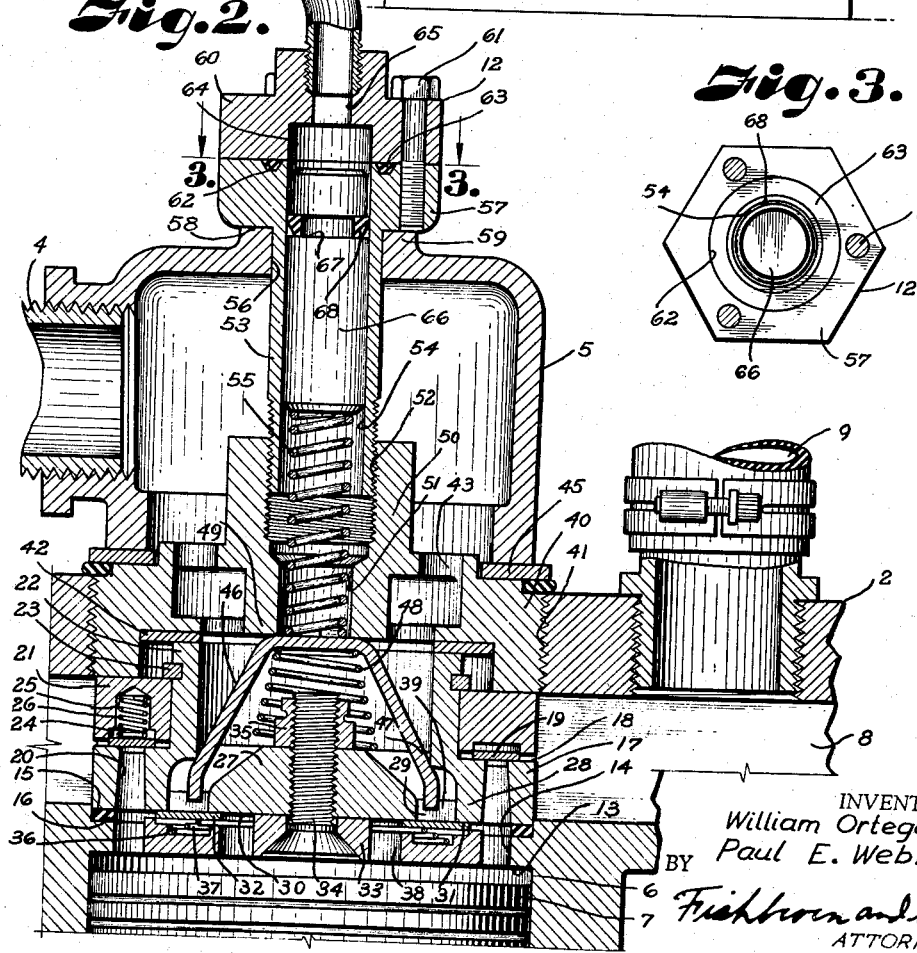
Fig. 1 is an end elevation of an air compressor and air tank with unloaders embodying the features of the present invention.
Fig. 2 is an enlarged vertical sectional view through the compressor valves, manifold and unloader assembly.
Fig. 3 is a transverse sectional view through the unloader on the line 3—3, Fig. 2.

Referring more in detail to the drawings:

1 designates an engine driven compressor preferably of the type having a plurality of cylinders with the cylinder head assembly 2 constructed and arranged whereby some of the cylinders act as engine cylinders and some as air compressor cylinders. The compressor has an intake filter 3 communicating through a duct 4 to an intake manifold housing 5 mounted on the cylinder head 2 and communicating through valves as later described with air compressor cylinders 6 each having a piston 7 reciprocable therein whereby air is compressed and discharged through a discharge manifold and passage 8 and duct 9 to an air receiver tank 10 to store the air under pressure. An air line 11 communicates the interior of the tank 10 with an unloader assembly 12 whereby a predetermined air pressure in the tank is communicated to the unloader to effect holding of the intake valve open as later described.

In the structure illustrated, the upper end of the cylinder 6 terminates in an inwardly extending flange 13 extending inwardly at the upper end of said cylinder and defining a bore 14. The cylinder head has a counterbore 15 extending downwardly from the manifold passage 8 to receive a valve seat gasket 16 engaged by a valve body 17 having an upwardly facing valve face 18 adapted to be engaged by a discharge valve disc 19 to close discharge passages 20 in the valve body 17 and communicating with the cylinder 6. An intake valve bumper 21 is sleeved on an upstanding cylindrical extension 22 of the valve body and is suitably retained thereon as by a retaining ring 23. The lower face of the bumper 21 is spaced from the valve face 18 and has a recess 24 therein to permit vertical movement of the discharge valve disc 19. The bumper also has a plurality of recesses 25 in which are located springs 26 tending to urge the discharge valve disc 19 downwardly in seating engagement with the valve face 18.

The valve body 17 has a center portion 27 supported from the outer portion 28 by spaced ribs 29, the center portion having an under face 30 in the same plane as the under face 31 of the outer portion whereby said faces cooperate to provide seating faces for an intake valve disc 32. An intake valve bumper 33 is secured to the center portion 27 by a suitable fastening device such as a screw 34 and nut 35, as illustrated in Fig. 2. The bumper has a recess 36 into which the intake valve disc 32 moves and a spring 37 is located into the recess and urges the intake valve disc 32 in seating engagement with the valve faces 30 and 31. The upper face of the bumper 33 is spaced from the seating faces 30 and 31 to provide a passage for air between the bumper and through ports 38 to the cylinder 6, the air flowing from a passage 39 between the valve body and the center portion 27.

A valve plug 40 is threadedly mounted in a threaded bore 41 in the upper portion of the cylinder head 2, a plug gasket 42 being compressed between the valve plug 40 and the upper end of the valve body extension 22 to form a seal therebetween. The valve plug has ports 43 therein to provide passage for air from above the plug through the ports and the valve body extension to the intake valve disc.

The intake manifold housing 5 is secured to the cylinder head 2 by suitable fastening devices such as bolts 44 with a gasket 45 being interposed between the intake manifold housing 5 and the valve plug 40 to form a seal therebetween whereby the passage in the intake manifold communicates with the ports 43 in the valve plug.

The unloader structure consists of a spider 46 having fingers 47 extending downwardly through the spaces between the ribs to engage the intake valve disc and hold same open when forced thereagainst. The spider is normally held out of contact with the intake valve disc 32 by a spring 48 sleeved on the nut 35 and engaging the spider 46 tending to hold same in engagement with the lower end 49 of a center portion 50 of the valve plug. The center portion 50 of the valve plug has an axial bore 51 terminating at its upper end in a threaded bore 52 into which the lower end of an unloader cylinder 53 is threaded, said cylinder 53 having a bore 54 in axial alignment with the bore 51 whereby a spring 55 in the bore 51 engages the upper portion of the spider 46 with the other end of said spring extending into the lower end of the cylinder 53. The cylinder extends through a bore 56 in the top of the intake manifold housing 5, the upper end of said cylinder terminating in an enlarged head or flange portion 57 which provides a shoulder 58 seating on the upper face of a boss 59 surrounding the bore 56. A cylinder cap 60 is mounted on the flanged end or head 57 of the cylinder and secured thereto by means of suitable fastening devices such as cap screws 61, the upper face of the cylinder flange or head 57 having a groove 62 receiving an O-ring type gasket 63 which is compressed by the cap 60 to form a seal therebetween. The lower portion of the cap has a bore 64 registering with the bore 54 of the cylinder 53, said bore in the cap terminating in a reduced partially threaded bore 65 into which is threaded the end of a fitting of the air line 11 whereby air from the tank 10 is applied to the upper end of the cylinder bore 54. An unloader piston 66 is slidably mounted in the cylinder bore 54, said piston having a groove 67 in which is located a packing ring 68 to form a seal between the piston and the cylinder bore 54. The lower end of the piston engages the upper end of the spring 55.

In normal operations with the air in the tank 10 below that desired, and with the engine driving the compressor pistons to reciprocate same, the downstroke of a piston 7 draws air from the filter 3 through the duct 4, intake manifold housing 5, and passes through the valve body 17 to the intake valve disc 32 which is drawn to open position compressing the spring 37 whereby air is drawn into the cylinder 6, the spring 48 holding the spider 46 upwardly in disengaged relation to the intake valve disc 32, and overcoming force applied through the air pressure in the tank 10 to the piston 66 tending to force the spider 46 downwardly. On the upstroke of the piston 7, the intake valve disc 32 closes, and as the pressure is built up in the cylinder it forces the discharge valve disc 19 upwardly against the spring 26 whereby the air is discharged under pressure through the manifold 8 and duct 9 to the tank 10. On the next downstroke of the piston 7, the discharge valve closes and intake valve opens. When sufficient pressure is built up in the tank 10, that pressure is applied to the piston 66 tending to force same downwardly compressing the spring 55 and overcoming the pressure of the spring 48 to force the spider fingers into engagement with the intake valve disc opening same whereby upon reciprocation of the piston 7 air will merely move in and out through the intake valve reducing the load on the compressor and allowing the engine to idle until such time as the pressure in the tank 10 is reduced whereby the spring 48 again overcomes the air pressure acting on the piston 66 to move the spider and fingers thereon out of engagement with the intake valve disc 32.

If leakage should occur through the unloader structure, the air in the tank 10 would escape through the unloader structure to the intake manifold. If it is necessary to replace the packing 68 because of leaks or otherwise service the unloader for any cause, a valve 69 in the line 11 is closed to prevent escape of air from the tank 10 and the cap 60 may be removed from the cylinder by unscrewing the cap screws 61 and lifting the cap 60 from said cylinder. The spring 55 will urge the piston 66 upwardly until it can be grasped above the flange or head 57 and removed from the cylinder. The packing 68 can then be replaced and the piston returned to the bore of the cylinder, and, if necessary, the O-ring 63 can be replaced and the cap 60 replaced on the cylinder and secured thereto by the cap screws 61. The valve 69 is then opened and the unloader is again ready for further operation of the compressor.

It is to be understood that while we have illustrated and described one form of our invention, it is not to be limited to the specific form or arrangement of parts herein described and shown except insofar as such limitations are included in the claim.

What we claim and desire to secure by Letters Patent is:

In an unloader for opening an intake valve of an air compressor having an intake housing with walls defining a flow passage therein and an intake valve assembly between the intake housing and a compressor cylinder to control communication between the cylinder and flow passage with a spider movable in said valve assembly and having fingers engageable with the intake valve for holding same open and a spring biasing said spider away from said valve whereby the spider fingers engage and hold the intake valve open only when the spring is overcome; comprising a center portion formed on said valve assembly having an axial bore therein, the upper end of said center portion bore terminating in a threaded section, an unloader cylinder comprising an elongate body member having a through axial bore therein and positioned in the intake housing whereby said body member bore is coaxial with said center portion bore, said elongate body member extending through the intake housing wall and having one end thereof threaded externally and engaged in said center portion threaded section and the other end thereof terminating in an enlarged head portion exteriorly of said intake housing wall, an unloader spring slidable in said bores and having one end thereof engaged with the spider, a piston slidably mounted in said body member bore with one end thereof engaged with the other end of said unloader spring, said piston having a circumferential groove intermediate the ends thereof, a packing ring in said circumferential groove and engaging the sides of said body member bore to provide a resilient seal therebetween, and a cap removably mounted on said enlarged head and closing the other end of said body member bore whereby said elongate body member with said piston and unloader spring may be removed from said air compressor without interrupting the operation thereof.

References Cited in the file of this patent

UNITED STATES PATENTS

| | | |
|---|---|---|
| 770,784 | Steedman | Sept. 27, 1904 |
| 1,274,383 | Callan | Aug. 6, 1918 |
| 1,275,843 | Callan | Aug. 13, 1918 |
| 1,470,077 | Haight | Oct. 9, 1923 |
| 1,505,604 | Redfield | Aug. 19, 1924 |
| 1,519,705 | Redfield | Dec. 16, 1924 |
| 1,606,060 | Cox | Nov. 9, 1926 |
| 1,623,489 | Naab | Apr. 5, 1927 |
| 1,741,426 | Merwarth | Dec. 31, 1929 |
| 1,796,796 | Le Valley | Mar. 17, 1931 |
| 2,141,069 | Newell | Dec. 20, 1938 |
| 2,626,100 | McIntyre | Jan. 20, 1953 |

FOREIGN PATENTS

| | | |
|---|---|---|
| 688,429 | Germany | Feb. 20, 1940 |